(No Model.)

S. E. NUTTING.
MAGNETIC REGULATOR.

No. 398,744. Patented Feb. 26, 1889.

Witnesses:
Chas. E. Gaylord.
C. E. Gorton.

Inventor:
Samuel E. Nutting,
By Banning & Banning,
Att'ys

UNITED STATES PATENT OFFICE.

SAMUEL E. NUTTING, OF CHICAGO, ILLINOIS, ASSIGNOR TO THE NUTTING ELECTRIC MANUFACTURING COMPANY, OF SAME PLACE.

MAGNETIC REGULATOR.

SPECIFICATION forming part of Letters Patent No. 398,744, dated February 26, 1889.

Application filed December 3, 1887. Serial No. 256,938. (No model.)

*To all whom it may concern:*

Be it known that I, SAMUEL E. NUTTING, a citizen of the United States, residing at Chicago, Illinois, have invented certain new and useful Improvements in Magnetic Regulators or Governors, of which the following is a specification.

The object of my invention is, in general terms, to devise means whereby I can automatically govern or regulate the amount of magnetism in the pole-pieces of a dynamo-electric machine or motor, and thereby the strength of the current to the requirements of the circuit; and my invention consists in the features and details of construction hereinafter described and claimed.

Figure 1:
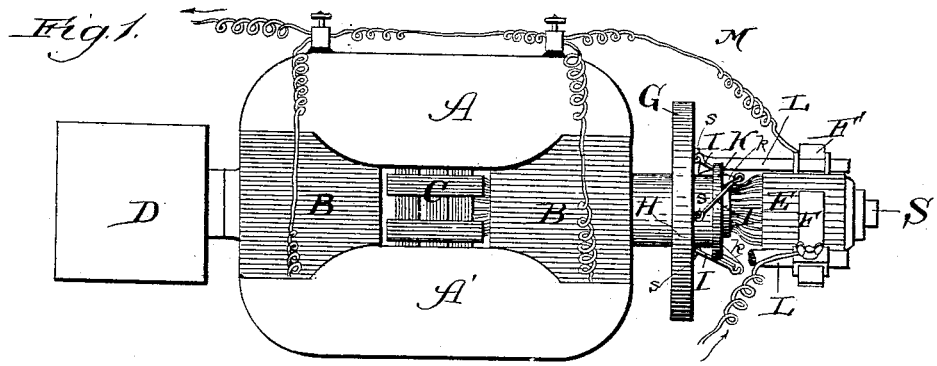
Figure 2:
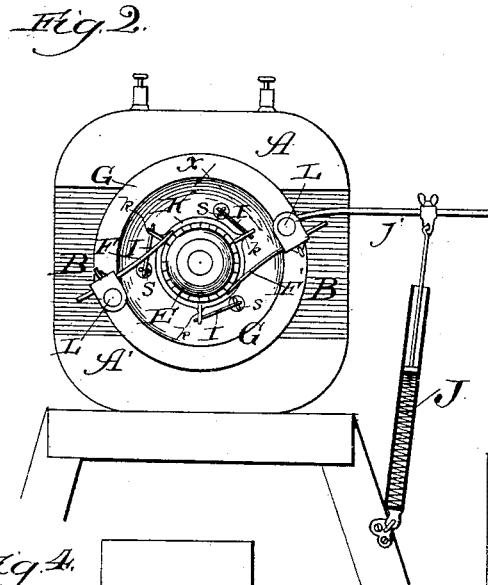
Figure 3:
Figure 5:
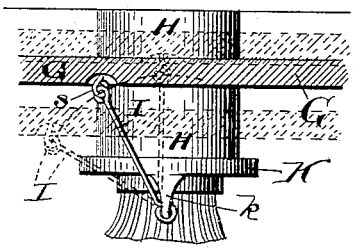
Figure 4:
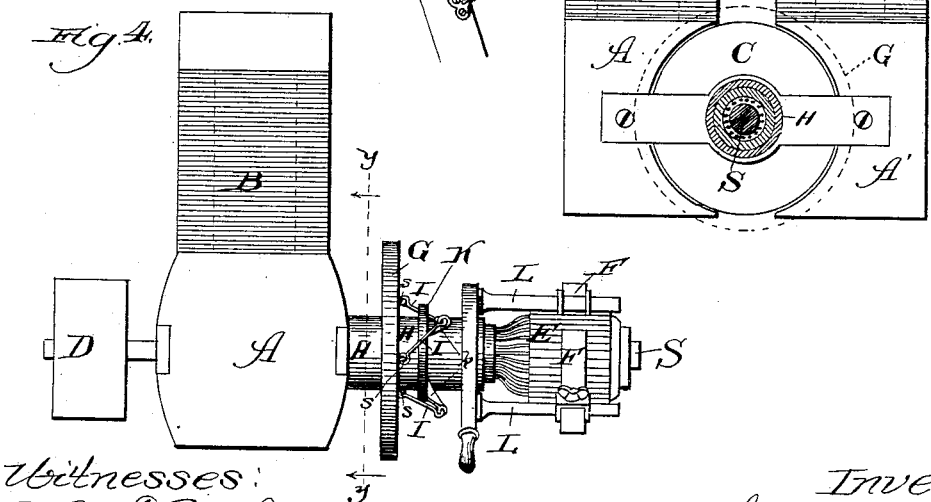

In the drawings, Figure 1 is a dynamo-electric machine or motor, showing the two pole-pieces, the commutator, the brushes, and my automatic governor or regulator in a position of partial approach to the pole-pieces. Fig. 2 is an end elevation of the same, showing a spring for bringing the governor to its normal position when released from the attraction of the magnetism in the pole-pieces. Fig. 3 is a plan view, enlarged, of the collar on which the governor moves back and forth, showing it in its different positions as subjected to greater or less attraction. Fig. 4 is a side elevation of an ordinary horseshoe dynamo machine or motor with my governor in place, but disconnected from the brush; and Fig. 5 is an end view of the same, taken in the line *y y* of Fig. 4, looking in the direction of the arrows.

In the drawings, A A' are the pole-pieces of my dynamo-electric machine or motor; B B, the field-coils; C, the armature; D, the pulley by which the armature-shaft is rotated; E, the commutator; F, the brushes; G, the governor; H, the collar on which it moves; I, the links by which its approach to the pole-pieces is controlled; J, the spring for bringing the governor back to its normal position when released from the magnetic attraction of the pole-pieces; K, a rim on the governor-collar; L, the brush-holder, which may be connected with the governor or not, as hereinafter described; and M, the wire of the circuit.

In making my improved automatic governor for controlling the amount of magnetism in the pole-pieces of a dynamo-electric machine or motor, and thereby the strength of the current to the requirements of the circuit, I confine myself to no special form of dynamo-electric machine or motor in connection with which I propose to use my improvements. I have employed them in connection with dynamos of various forms of construction, and have found that they are applicable to one as well as to another. As it would be impracticable to describe my governor in connection with all the various kinds of dynamos with which it can be used, I have concluded to describe its use in connection with two forms of pole-pieces illustrated in the drawings, from which its application to other forms will be understood.

I may say further, before minutely describing the construction and operation of my improvements, that I make use of the attractive power of the magnetism in the pole-pieces to regulate and control the position of my governor, which in turn regulates and controls the strength of the current in the circuit to meet the varying demands arising from the varying resistance which the current is subjected to in doing its work.

In making and applying my automatic governor I arrange the pole-pieces and the magnetic field-coils in proper position to permit the pole-pieces to become magnetized. I employ an armature of any kind and construction that may be preferred, and mount it on an armature-shaft to permit it to be rotated in any of the usual well-known ways. As shown in the particular kind of dynamo illustrated in the first three figures of the drawings, the field-magnet coils are arranged between the two pole-pieces and preferably near their four corners. The armature is mounted on a shaft, S, which passes between the field-magnet coils lengthwise of the machine, while the armature revolves between these coils crosswise of the machine. At one end of the armature-shaft is arranged a pulley by which power may be applied to rotate the shaft and the armature which is mounted upon the same, so as to rotate therewith. At the other end of the armature-shaft is mounted the commutator E, which also rotates with the shaft. Wires lead from the armature along the shaft to the commutator, so that the current may be carried from the armature through the circuit. Between the commutator and the pole-pieces, and preferably around the armature-shaft, is arranged a bearing on which the governor is mounted. In the drawings this bearing is represented as a collar surrounding or encircling the shaft, though other forms may be employed so long as the governor can be mounted thereon and be movable back and forth. I do not, therefore, specially emphasize the particular form or location of the bearing on which the governor is to be mounted. The outer end of this collar is preferably provided with a flange or rim, K, which forms a limit to the outer movement of the governor, as it is obvious that it can only move back and forth between this rim and the pole-pieces of the dynamo. Preferably attached to the rim, as shown in the drawings, are projections $k$, which extend out from the rim such distance as may be desired. The governor is provided with a number of staples or lips, $s$, to serve as means of attaching such number of links as may be desired to them. The other ends of these links are attached to the projections $k$.

I do not confine myself to any particular number of projections $k$ or links $l$, nor to any special mode of attaching the links to the governor or to the projections; nor do I require the projections to extend out from the rim, as any other fixed points adapted to hold the outer ends of the links will serve the purpose. As the object of these links is to make the governor approach the pole-pieces of the dynamo in a way that will increase the resistance, or, in other words, make its approach more difficult the nearer it comes to the pole-pieces, such number of links and such length of link may be employed as will give the result desired. The proper length of link can always be determined by making it long enough to permit the governor to approach the pole-pieces to the utmost limit desired when the links are parallel with the bearing on which the governor is mounted. By reference to Fig. 3 the link is shown in this parallel position, and the governor in its nearest approach to the pole-pieces by dotted outlines.

To bring the governor back to its normal position, which is that farthest away from the pole-pieces, I employ a spring or retractor, J, (shown in Fig. 2,) which, as soon as the attraction of the governor to the pole-pieces is removed or diminished, exerts its power to bring the governor back away from the pole-pieces. Any other means—as a weight, for instance—which will tend to bring the governor back to its normal position may be employed instead of a spring, if desired.

My governor must be made of iron or some material that will be susceptible to magnetic attraction. As the pole-pieces become magnetized to a greater or less extent as the strength of the current varies, it will exert its magnetic power on the governor and draw it toward them. As it begins to approach the pole-pieces, the links I begin to assume a position nearer and nearer parallel with the bearing on which the governor is mounted, as shown in Fig. 3. This causes the governor to approach the pole-pieces with a spiral movement, and as the links approach a parallel position the governor is drawn toward the pole-pieces with more and more difficulty, owing to the decreasing leverage afforded by the position of the links. As it approaches the pole-pieces, it turns spirally on its bearing, as above said, and, through its connection with the spring J, compresses it. If in the place of a spring some other means be (as a weight) employed to bring the governor back to its normal position, it will affect such means whatever they be. As the governor approaches the pole-pieces, the magnetism will pass from one pole through the governor to the other, and thus diminish the magnetic power of the pole-pieces on the armature. I am simply stating what I have found from actual tests and experiments takes place, without entering upon an explanation of the cause. This passage of magnetism from the pole-pieces into the governor diminishes their magnetic power, so that instantly they cease to affect the action of the armature to the extent that they did before. This diminishes the strength of the current in the circuit. As the current is diminished or weakened, the pole-pieces instantly cease to exert as great an attraction on the governor as they did before such diminution, and consequently the governor, being less strongly attracted, is brought back by the spring or weight, against whose resistance it had been approaching the pole-pieces, until it reaches a point where its attraction by the pole-pieces and its retraction by the retractor are in equilibrium, when it remains stationary until the magnetic power of the pole-pieces is increased, when it will again approach them and diminish such power, and thereby the strength of the current. In this way, by a constant and instantaneous approach and retraction, the governor is able to automatically regulate and control the strength of the magnetism in the pole-pieces.

I have to this point described the governor as wholly disconnected from the brushes, which rub against the commutator to form the connection of the circuit, as shown in Fig. 4. It may, however, if preferred, be connected to the brushes by connecting the ends of the brush-holders L to it. This arrangement is shown in Fig. 1, where one of the brush-holders is extended far enough to attach its ends to the governor, while the other is broken away to more fully show some of the parts. When the brushes are thus connected with the governor, they will turn as the governor turns, either as it advances toward the pole-pieces or recedes from them. By looking at the brushes (shown in Fig. 1) it will be seen that as the governor turns on its bearing to approach the pole-pieces the ends of the brushes will move to a position on the commutator near the top and bottom, and as the governor turns in the opposite direction and recedes from the pole-pieces the ends of the brushes will be turned to a position on the commutator near its horizontal center. As the action of the armature is always greatest when the brushes are in that part of the commutator which most nearly corresponds to a line drawn through the center of the space between the pole-pieces, it will be obvious that as the ends of the brushes are moved by the spiral rotation of the governor toward the pole-pieces away from such central line the strength of the current will be diminished, while as they are brought toward such central line by the rotation of the governor away from the pole-pieces the strength of the current will be increased. In this way the position of the brushes on the commutator can be made to co-operate with the governor in increasing or diminishing the strength of the current; but, as above said, the governor can be depended upon to regulate and control the amount of magnetism in the pole-pieces, and consequently the strength of the current, without reference to the brushes, and so in Fig. 4 it is shown disconnected from the brushes. I thus provide for its use in either way, as may be preferred. In each case, however, I employ an automatic governor or regulator, which is brought toward the pole-pieces by the strength of the magnetism and against the action of a retractor, which causes the governor to recede from the pole-pieces when the strength of the magnetism is diminished. The resistance to the power of the magnetism should always be an increasing one, which augments slightly faster than the increasing strength of the magnetism, so that the governor can be retracted upon any diminution of the magnetic power.

In conclusion, I desire to say that the essential idea of my invention consists in the employment of a governor or regulator, which is so mounted, hung, placed, or arranged in reference to the pole-pieces as to be drawn, moved, or swung toward them by magnetic attraction against constantly-increasing resistance, whether effected by links, springs, weights, or other means, and which, as it approaches the pole-pieces, will diminish their magnetic attraction and their action on the armature, and as a consequence the strength of the current, and which will be retracted by rotation, swinging, or otherwise, as the attractive power of the magnetized pole-pieces is diminished, so that a constant adjustment or regulation of the current in the circuit may be automatically effected and maintained.

What I regard as new, and desire to secure by Letters Patent, is—

1. In a dynamo-electric machine or motor, an automatic governor moving toward the pole-pieces by the attraction of their magnetism against a resistance which increases more rapidly than said attraction, and diminishing the action of the pole-pieces on the armature as it approaches them, the planes of the governor and the pole-pieces being parallel, and the distance between them being variable, according to the varying attraction of the magnetism, substantially as described.

2. In a dynamo-electric machine or motor, an automatic governor moving toward the pole-pieces by the attraction of their magnetism against a resistance which increases more rapidly than said attraction, and also against the resistance of a retractor, which as the magnetism of the pole-pieces diminishes withdraws the governor, the planes of the governor and the pole-pieces being parallel, and the distance between them being variable, according to the varying attraction of the magnetism, substantially as described.

3. In a dynamo-electric machine or motor, the combination of an automatic governor, a bearing on which it is mounted, and links connecting the governor to fixed points, whereby the governor approaches toward and recedes from the pole-pieces in a spiral rotation, substantially as described.

4. In a dynamo-electric machine or motor, the combination of an automatic governor, a bearing on which it is mounted, a retractor, and links connecting the governor to fixed points, said links tending to a position parallel to the bearing of the governor as it reaches the point of its nearest approach to the pole-pieces, whereby the governor approaches the pole-pieces in a spiral rotation of increasing resistance, substantially as described.

5. In a dynamo-electric machine or motor, the combination of an automatic governor, moving in spiral rotation toward the pole-pieces by the attraction of their magnetism, and brushes to effect the connection in the circuit, said brushes being connected with the governor and rotatable therewith, substantially as described.

6. In a dynamo-electric machine or motor, the combination of an automatic governor, moving in spiral rotation toward the pole-pieces by the attraction of their magnetism, and brushes to effect the connection in the circuit, said brushes being connected with the governor and rotatable therewith in a direction that will move their ends away from a line central between the pole-pieces as the governor approaches them, and toward a line central between the pole-pieces as the governor recedes from them, whereby the brushes co-operate with the governor in regulating the strength of the current in the circuit, substantially as described.

7. In a dynamo-electric machine or motor, the combination of an automatic governor moving toward the pole-pieces by the attraction of their magnetism against a resistance which increases more rapidly than such attraction, a spring-retractor, and an arm connecting the governor with the spring-retractor, whereby as the magnetism diminishes the retractor withdraws the governor from the pole-pieces, the planes of the governor and the pole-pieces being parallel, and the distance between them being variable, according to the varying attraction of the magnetism, substantially as described.

SAMUEL E. NUTTING.

Witnesses:
 THOMAS A. BANNING,
 GEORGE S. PAYSON.

It is hereby certified that in Letters Patent No. 398,744, granted February 26, 1889, upon the application of Samuel E. Nutting, of Chicago, Illinois, for an improvement in "Magnetic Regulators," an error appears in the printed specification requiring correction as follows: In line 30, page 2, the reference letter "l" should read *I;* and that the Letters Patent should be read with this correction therein that the same may conform to the record of the case in the Patent Office.

Signed, countersigned, and sealed this 26th day of March, A. D. 1889.

[SEAL.]

CYRUS BUSSEY,
*Assistant Secretary of the Interior.*

Countersigned:

BENTON J. HALL,
*Commissioner of Patents.*